US009177464B2

(12) United States Patent
Gregory

(10) Patent No.: US 9,177,464 B2
(45) Date of Patent: Nov. 3, 2015

(54) METHOD AND SYSTEM FOR UNTETHERED TWO-WAY VOICE COMMUNICATION FOR AN ALARM SYSTEM

(71) Applicant: Michael Gregory, Carrollton, TX (US)

(72) Inventor: Michael Gregory, Carrollton, TX (US)

(73) Assignee: NUMEREX CORP., Atlanta, GA (US)

( * ) Notice: Subject to any disclaimer, the term of this patent is extended or adjusted under 35 U.S.C. 154(b) by 168 days.

(21) Appl. No.: 14/039,573

(22) Filed: Sep. 27, 2013

(65) Prior Publication Data

US 2014/0094137 A1   Apr. 3, 2014

Related U.S. Application Data

(60) Provisional application No. 61/707,232, filed on Sep. 28, 2012.

(51) Int. Cl.
*H04M 11/04* (2006.01)
*G08B 25/01* (2006.01)
*H04W 4/22* (2009.01)
*H04W 4/02* (2009.01)
*G08B 25/00* (2006.01)

(52) U.S. Cl.
CPC .............. *G08B 25/014* (2013.01); *H04W 4/02* (2013.01); *H04W 4/22* (2013.01); *G08B 25/009* (2013.01)

(58) Field of Classification Search
USPC ........................... 455/404.2, 404.1, 457, 521
See application file for complete search history.

(56) References Cited

U.S. PATENT DOCUMENTS

| | | |
|---|---|---|
| 4,465,904 A | 8/1984 | Gottsegen et al. |
| 4,692,742 A | 9/1987 | Raizen et al. |
| 4,918,717 A | 4/1990 | Bissonnette et al. |
| 5,134,644 A | 7/1992 | Garton et al. |
| 5,195,126 A | 3/1993 | Carrier et al. |
| 5,365,568 A | 11/1994 | Gilbert |
| 5,400,011 A | 3/1995 | Sutton |
| 5,463,595 A | 10/1995 | Rodhall |
| 5,568,475 A | 10/1996 | Doshi et al. |
| 5,736,927 A | 4/1998 | Stebbins et al. |
| 5,796,633 A | 8/1998 | Burgess et al. |
| 5,808,547 A | 9/1998 | Carney |
| 5,838,223 A | 11/1998 | Gallant et al. |
| 5,877,684 A | 3/1999 | Lu |

(Continued)

OTHER PUBLICATIONS

International Search Report for PCT/US13/62234, issued Dec. 11, 2013.

(Continued)

*Primary Examiner* — David Q Nguyen
(74) *Attorney, Agent, or Firm* — King & Spaulding LLP

(57) ABSTRACT

An alarm system can provide security, fire, protection, or other alarm services for a premises, such as for a building or other property. When the alarm system detects an alarm condition, such as an intrusion or a fire, a two-way voice channel can be opened between the premises and a remote entity. Via the two-way voice channel, an operator at a central monitoring station can verbally communicate with someone at the premises, for example. A person associated with the alarm system may own a mobile communication device, such as a smartphone or other handheld cellular device. If the mobile communication device located is at the premises, the two-way voice channel can be established between the remote entity and the mobile communication device. Location of the mobile communication device can be determined based on GPS, service provider tracking, or user entry, for example.

15 Claims, 7 Drawing Sheets

(56) References Cited

U.S. PATENT DOCUMENTS

| | | |
|---|---|---|
| 5,923,731 A | 7/1999 | McClure |
| 5,940,474 A | 8/1999 | Ruus |
| 6,075,451 A | 6/2000 | Lebowitz et al. |
| 6,215,404 B1 | 4/2001 | Morales |
| 6,243,373 B1 | 6/2001 | Turock |
| 6,272,212 B1 | 8/2001 | Wulforst et al. |
| 6,288,642 B1 | 9/2001 | Dohrmann |
| 6,311,072 B1 | 10/2001 | Barclay et al. |
| 6,369,705 B1 | 4/2002 | Kennedy |
| 6,381,307 B1 | 4/2002 | Jeffers et al. |
| 6,400,265 B1 | 6/2002 | Saylor et al. |
| 6,438,124 B1 | 8/2002 | Wilkes et al. |
| 6,452,490 B1 | 9/2002 | Garland et al. |
| 6,493,435 B1 | 12/2002 | Petricoin |
| 6,553,100 B1 | 4/2003 | Chen et al. |
| 6,574,480 B1 | 6/2003 | Foladare et al. |
| 6,577,234 B1 | 6/2003 | Dohrmann |
| 6,603,845 B2 | 8/2003 | Jensen et al. |
| 6,661,340 B1 | 12/2003 | Saylor et al. |
| 6,683,526 B2 | 1/2004 | Bellin |
| 6,829,478 B1 | 12/2004 | Layton et al. |
| 6,831,557 B1 | 12/2004 | Hess |
| 6,870,906 B2 | 3/2005 | Dawson |
| 6,928,148 B2 | 8/2005 | Simon et al. |
| 6,965,313 B1 | 11/2005 | Saylor et al. |
| 6,973,165 B2 | 12/2005 | Giacopelli et al. |
| 7,002,462 B2 | 2/2006 | Welch |
| 7,009,519 B2 | 3/2006 | Leonard et al. |
| 7,103,152 B2 | 9/2006 | Naidoo et al. |
| 7,113,090 B1 | 9/2006 | Saylor et al. |
| 7,119,609 B2 | 10/2006 | Naidoo et al. |
| 7,245,703 B2 | 7/2007 | Elliot et al. |
| 7,262,690 B2 | 8/2007 | Heaton et al. |
| 7,406,710 B1 | 7/2008 | Zellner et al. |
| 7,429,921 B2 | 9/2008 | Seeley et al. |
| 7,440,554 B2 | 10/2008 | Elliot et al. |
| 7,542,721 B1 | 6/2009 | Bonner et al. |
| 7,558,379 B2 | 7/2009 | Winick |
| 7,593,513 B2 | 9/2009 | Muller |
| 7,613,278 B2 | 11/2009 | Elliot et al. |
| 7,619,512 B2 | 11/2009 | Trundle |
| 7,633,385 B2 | 12/2009 | Cohn et al. |
| 7,653,186 B2 | 1/2010 | Hosain et al. |
| 7,734,020 B2 | 6/2010 | Elliot et al. |
| 7,751,540 B2 | 7/2010 | Whitfield et al. |
| 7,778,394 B2 | 8/2010 | Small et al. |
| 7,820,841 B2 | 10/2010 | Van Toor et al. |
| 7,848,505 B2 | 12/2010 | Martin et al. |
| 7,853,200 B2 | 12/2010 | Blum et al. |
| 7,855,635 B2 | 12/2010 | Cohn et al. |
| 7,911,341 B2 | 3/2011 | Raji et al. |
| 7,920,841 B2 | 4/2011 | Martin et al. |
| 7,920,842 B2 | 4/2011 | Martin et al. |
| 7,920,843 B2 | 4/2011 | Martin et al. |
| 7,961,088 B2 | 6/2011 | Watts et al. |
| 8,022,807 B2 | 9/2011 | Martin et al. |
| 8,073,931 B2 | 12/2011 | Dawes et al. |
| 8,116,724 B2 | 2/2012 | Peabody |
| 8,214,494 B1 | 7/2012 | Slavin |
| 8,335,842 B2 | 12/2012 | Raji et al. |
| 8,350,694 B1 | 1/2013 | Trundle et al. |
| 8,456,293 B1 | 6/2013 | Trundle et al. |
| 8,473,619 B2 | 6/2013 | Baum et al. |
| 8,478,844 B2 | 7/2013 | Baum et al. |
| 8,493,202 B1 | 7/2013 | Trundle et al. |
| 8,520,072 B1 | 8/2013 | Slavin et al. |
| 8,525,665 B1 | 9/2013 | Trundle et al. |
| 2002/0103898 A1 | 8/2002 | Moyer |
| 2002/0147982 A1 | 10/2002 | Naidoo et al. |
| 2002/0176581 A1 | 11/2002 | Bilgic |
| 2002/0177428 A1 | 11/2002 | Menard et al. |
| 2003/0027547 A1 | 2/2003 | Wade |
| 2003/0071724 A1 | 4/2003 | D'Amico |
| 2004/0005044 A1 | 1/2004 | Yeh |
| 2004/0086088 A1 | 5/2004 | Naidoo |
| 2004/0086093 A1 | 5/2004 | Schranz |
| 2005/0099893 A1 | 5/2005 | Jyrinki |
| 2006/0023848 A1 | 2/2006 | Mohler et al. |
| 2006/0176167 A1 | 8/2006 | Dohrmann |
| 2007/0115930 A1 | 5/2007 | Reynolds et al. |
| 2007/0143838 A1 | 6/2007 | Milligan |
| 2007/0155412 A1 | 7/2007 | Kaltsukis |
| 2008/0084291 A1 | 4/2008 | Campion, Jr. |
| 2008/0117029 A1 | 5/2008 | Dohrmann et al. |
| 2008/0191863 A1 | 8/2008 | Boling |
| 2009/0017757 A1 | 1/2009 | Koga |
| 2009/0213999 A1 | 8/2009 | Farrand |
| 2009/0248967 A1 | 10/2009 | Sharma |
| 2009/0264155 A1 | 10/2009 | Nakayama et al. |
| 2009/0274104 A1 | 11/2009 | Addy |
| 2010/0007488 A1 | 1/2010 | Sharma et al. |
| 2010/0052890 A1 | 3/2010 | Trundle |
| 2010/0121948 A1 | 5/2010 | Procopio |
| 2010/0277271 A1 | 11/2010 | Elliot et al. |
| 2010/0289643 A1 | 11/2010 | Trundle |
| 2010/0289644 A1 | 11/2010 | Slavin |
| 2011/0065414 A1 | 3/2011 | Frenette |
| 2011/0169628 A1 | 7/2011 | Elliot |
| 2011/0319071 A1 | 12/2011 | Beppler et al. |
| 2012/0027010 A1 | 2/2012 | Elliot et al. |
| 2012/0139718 A1 | 6/2012 | Foisy et al. |
| 2012/0250833 A1 | 10/2012 | Smith et al. |
| 2012/0250834 A1 | 10/2012 | Smith |
| 2012/0275588 A1 | 11/2012 | Gregory |
| 2013/0189946 A1 | 7/2013 | Swanson |
| 2013/0194091 A1 | 8/2013 | Trundle |
| 2013/0215266 A1 | 8/2013 | Trundle |
| 2013/0234840 A1 | 9/2013 | Trundle |

OTHER PUBLICATIONS

U.S. Appl. No. 13/939,460, Harvey Elliot et al.
U.S. Appl. No. 14/039,821, Michael Gregory.
U.S. Appl. No. 14/050,655, Harvey Elliot et al.

METHOD AND SYSTEM FOR UNTETHERED TWO-WAY VOICE COMMUNICATION FOR AN ALARM SYSTEM

CROSS REFERENCE TO PRIORITY APPLICATION

This application claims priority to U.S. Provisional Patent Application No. 61/707,232 filed Sep. 28, 2012 in the name of Michael Gregory and entitled "Method and System for Untethered Two-Way Voice in an Alarm System," the entire contents of which are hereby incorporated herein by reference.

FIELD OF THE TECHNOLOGY

The present technology relates to alarm systems and more particularly to technology for providing two-way voice communication for an alarm system.

BACKGROUND

With some conventional alarm systems, a person at a monitored premises may engage in audio communications with a central monitoring station service using a speaker and microphone mounted or tethered to an alarm panel of the alarm system. One disadvantage of this approach is that the two-way audio functionality is ineffective if the person is on the monitored premises but away from the speaker and microphone, and thus cannot communicate. Additionally, conventional alarm systems that lack two-way audio functionality may need cost prohibitive equipment and labor cost to be upgraded to include such two-way audio capability.

Need is apparent for improvements in alarm system technology. Improved technology is needed for associating two-way voice communications with an alarm system. Need exists to provide a user of an alarm system with a capability for two-way voice when the user is at an arbitrary location on the premises protected by the alarm system. A capability addressing one or more such needs, or some other related deficiency in the art, would enhance alarm systems.

SUMMARY

An alarm system can provide security, fire, protection, or other alarm services for a premises, such as for a building or other property. The alarm system may detect an alarm condition, such as an intrusion, smoke, carbon monoxide, a fire, or some other hazard or parameter appropriate for issuance of an alarm. The alarm condition may warrant opening a two-way voice channel between the premises and a remote entity so that a person at the premises can verbally communicate with someone else who is offsite from the premises. The two-way voice channel can extend from the premises to a central monitoring station, to an operator at the central monitoring station or otherwise providing monitoring service, or to some other person, party, or entity, for example.

In one aspect, a mobile communication device, for example a smartphone that utilizes cellular communication, may be associated with the premises. Such a mobile communication device may be owned or operated by a person who owns the premises or otherwise has an interest in security of the premises. If the mobile communication device is at the premises when a determination is made to open the two-way voice channel, the two-way voice channel can utilize the mobile communication device to receive sound generated at the premises and/or to emit sound at the premises.

In one aspect, a determination can be made as to whether the mobile communication device is at the premises based on global positioning system (GPS) signals associated with the mobile communication device.

In one aspect, a determination can be made as to whether the mobile communication device is at the premises based on location information provided by a provider of cellular communication services for the mobile communication device.

In one aspect, a determination can be made as to whether the mobile communication device is at the premises based on whether a user has made an entry on the mobile communication device indicating that the user is on or off the premises.

The foregoing discussion of providing two-way voice communications associated with an alarm system is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
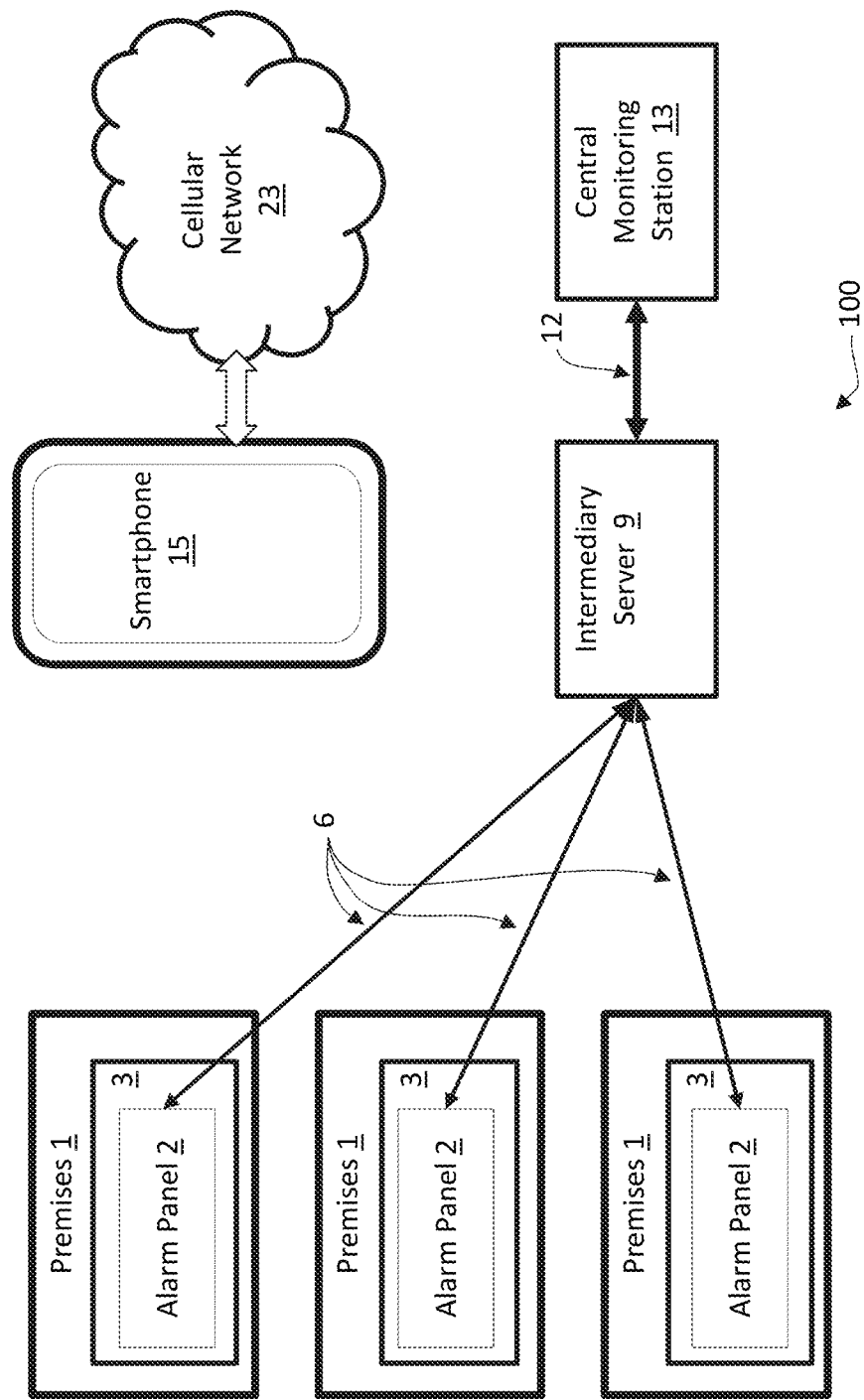
FIG. 1 is a functional block diagram of a system in which multiple premises connect to a central monitoring station via an intermediary server and in which a cellular network and a smartphone provide associated communication services, in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

As discussed in further detail below, audio communications can be associated with an alarm system located at a premises. The audio communications can be between a remote entity, such as a central monitoring service, and a user who is at the alarm-monitored premises. The user may communicate through a smartphone, tablet computer, personal computer, or other appropriate communication device, for example.

Some example embodiments of the present technology address situations where the user is not physically near the monitored premises' alarm system, by using a cellular communication device, such as a smartphone, as the two-way audio interface. The term "smartphone," as used herein, generally refers to a mobile phone with built-in applications and Internet access and is intended to be sufficiently broad to cover devices commonly described in the industry and trade as "smartphones." A personal computer or a tablet computer that is equipped with a microphone and a speaker and that is capable of wireless communication can be a type of smartphone, for example.

In some example embodiments, the smartphone communication can further provide two-way voice communication in support of a Personal Emergency Response System (PERS), medical alarm and alert systems, and/or other appropriate systems that would benefit from two-way voice communication.

In some example embodiments, the smartphone can provide an alarm system with two-way voice functionality without necessarily requiring the alarm system to have a dedicated speaker and microphone.

In some example embodiments, the user can be mobile within the monitored premises yet still be capable of two-way audio interaction through the premise's alarm system.

In some embodiments, the smartphone can have a hands-free feature so that a user can engage in a hands-free two-way voice session, for example while the smartphone is on a nightstand and the user is in bed.

In some example embodiments, false alarms are reduced by restricting alarm call delivery to a smartphone that is confirmed to be at the monitored premises.

In some example embodiments, an alarm call may be sent to a user, via a smartphone of the user, while the user is not at the monitored premises. Upon receipt of the alarm call, the user can interact with the alarm system via the smartphone to advise that he or she is not at premises. The interaction can cause the alarm call to be redirected to a different smartphone that is actually at the monitored premises.

In some example embodiments, a two-way voice software application, in common vernacular referred to as an "app," is installed on one or more smartphones of the user that would be located within the monitored premises at least occasionally. Such smartphones may be identified and registered with an alarm monitoring service. When the alarm system reports an alarm event to a server of the alarm monitoring service, the server can poll each smartphone previously registered to the monitored premises' alarm system to obtain the current locations of the smartphones. The server may comprise an intermediary server or a gateway, for example, located in a geographical location remote from a security alarm central monitoring station or integrated with or positioned at the central monitoring station.

In some example embodiments, the user can engage a button of the aforementioned app (or make some other entry in the smartphone) to indicate manually that he or she (and the smartphone) is at the monitored premises.

In some example embodiments, location of the smartphone is made automatically using a computer-executed routine that compares geographic coordinates obtained from a built-in GPS receiver to predetermined coordinates of the monitored premises' alarm system.

In some example embodiments, an automated method identifies smartphones that have recently been within a designated wireless range (for example, within "Bluetooth" proximity) of the monitored premises' alarm system.

If a smartphone is determined to be located at the monitored premises when conditions warrant opening a voice channel, then a prompt or other data can be sent to the app running on the smartphone. The prompt can direct the smartphone to answer on "zero rings" in hands-free mode, for example. In this situation, the app running on the smartphone can display a message indicating to the user that emergency auto-answer has been enabled. If the prompt is initiated from the server of the alarm monitoring service, the server can also send the alarm event and a two-way voice command to a predetermined security alarm central monitoring station. Accordingly, the two-way voice session can extend from an on-premises smartphone to the central monitoring station, so that a person on the premises may speak with an operator at the central monitoring station.

In some example embodiments, the server of the alarm monitoring service calls the first cell phone identified as being at the monitored premises. The smartphone app issues a notification about initiating the two-way voice session, for example presenting a message such as "Emergency Call in Progress, Wait for Response" on the smartphone's display. The server of the alarm monitoring service interconnects the audio call to a predetermined central station monitoring service. At this point, the smartphone app may display another notification message, such as "Emergency Call connected—wait for Operator." The user is then connected via his or her smartphone with the central station monitoring service, typically with a person associated with the central monitoring station. In some embodiments, the app may force the smartphone into a hands-free mode.

In some example embodiments, the user can press a smartphone button (or otherwise make an entry) that triggers the server of the alarm monitoring service to send a command to the alarm system. The command may toggle off sirens to enhance ability to listen or announce/talk to the home. Alternatively, the operator at the central station monitoring service can send a similar command that triggers a suspension of alarm noise in order to facilitate voice communication.

In some example embodiments, such audio calls to the smartphone can be conveyed over a service provider's wireless digital voice channels or within a VoIP or VoIP-like channel within a service provider's data channels.

"Voice-over-Internet Protocol" or "VoIP" is a generic term commonly referring to the communication protocols, technologies, methodologies, and transmission techniques involved in the delivery of voice communications and multimedia sessions over Internet Protocol (IP) networks, such as (but not limited to) the Internet. Technologies within the scope of VoIP can include communication protocols, technologies, methodologies, and transmission techniques such as IP telephony, Internet telephony, voice over broadband (VoBB), broadband telephony, IP communications, broadband phone, and Voice over LTE (VoLTE), for example.

In some example embodiments, multiple smartphones may be identified as being at the monitored premises concurrently. In this situation, all the onsite smartphones (or two or more onsite smartphones) may simultaneously participate in the same two-way audio call in conference call fashion. Alternatively, when multiple smartphones are identified as being at the monitored premises, they may simultaneously be connected to the central station monitoring service, and the central station monitoring service can toggle between individual connected smartphones.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Figure 2:
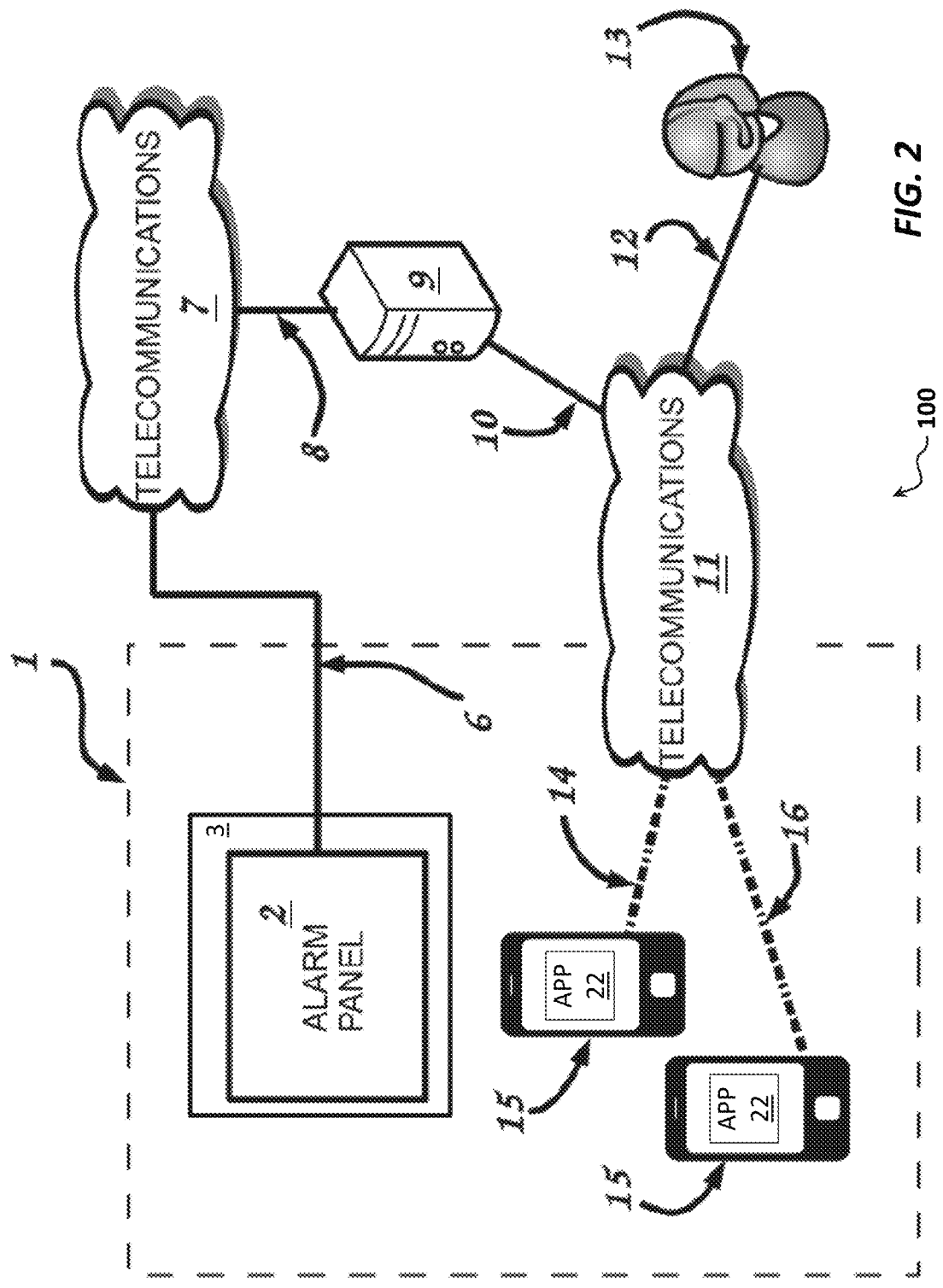
FIG. 2 is a functional block diagram providing a representative network structure for the system illustrated in FIG. 1, in accordance with some example embodiments of the present technology.
Figure 3:
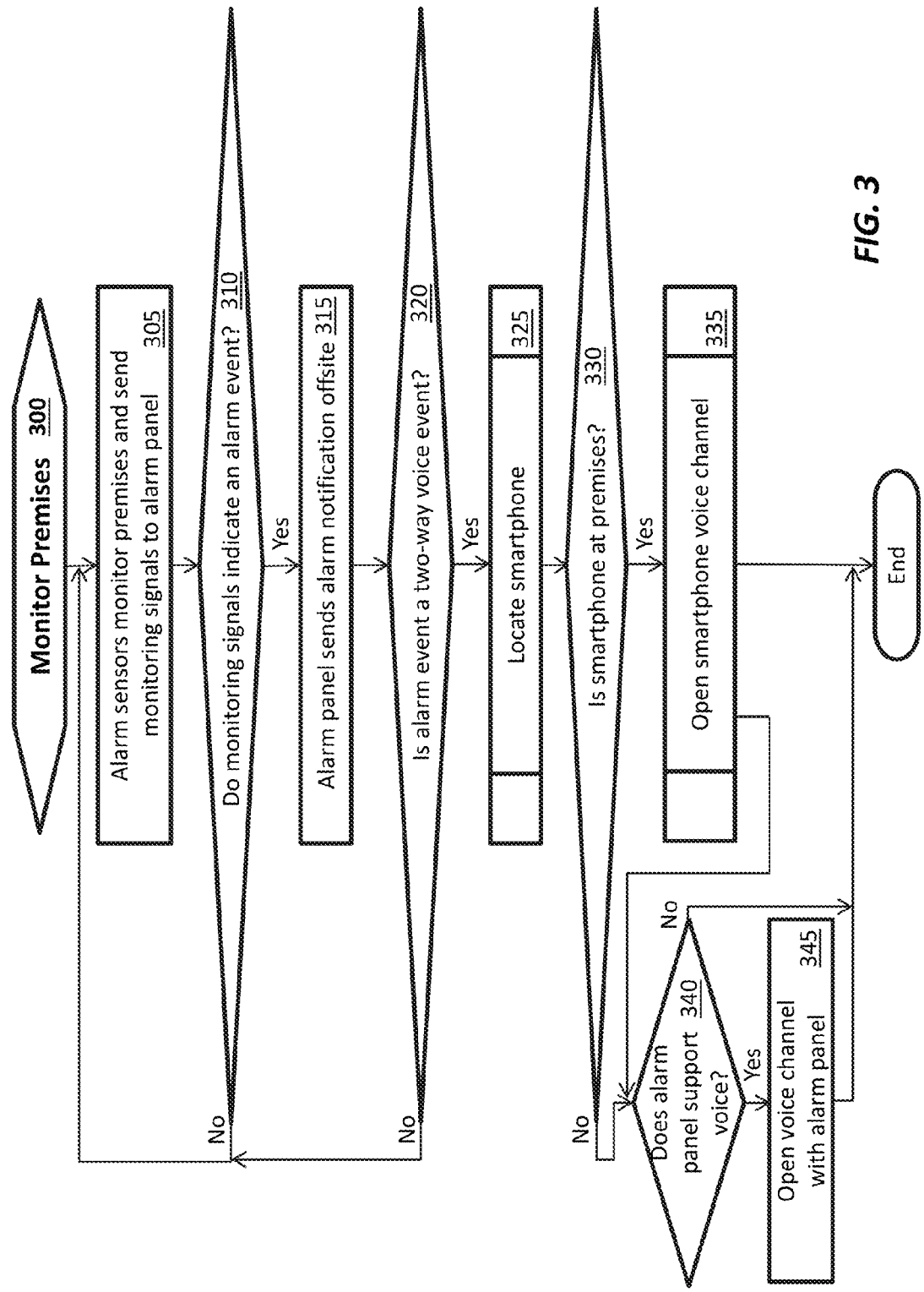
FIG. 3 is a flowchart of a process for monitoring a premises in which a smartphone may provide two-way voice communication from the premises, in accordance with some example embodiments of the present technology.
Figure 4:
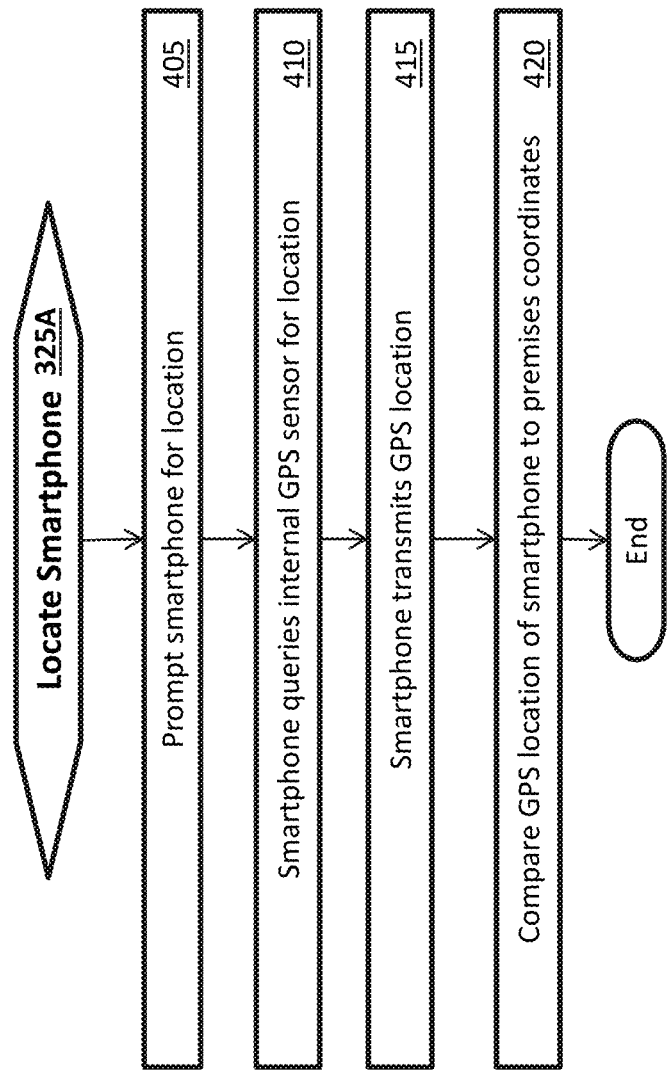
FIG. 4 is a flowchart of a process for locating a smartphone in connection with monitoring a premises as described in FIG. 3, in accordance with some example embodiments of the present technology.
Figure 5:
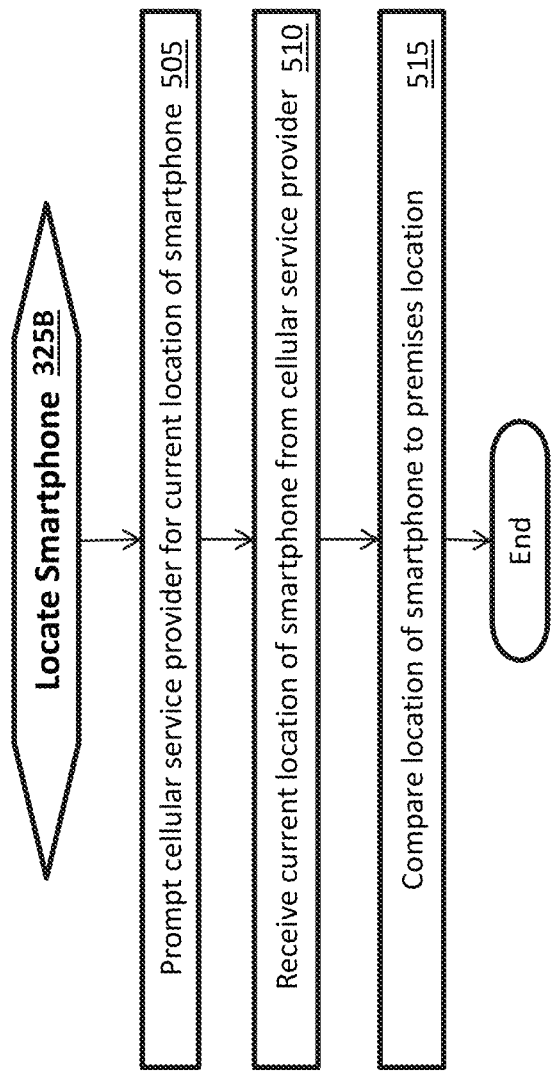
FIG. 5 is a flowchart of another process for locating a smartphone in connection with monitoring a premises as described in FIG. 3, in accordance with some example embodiments of the present technology.
Figure 6:
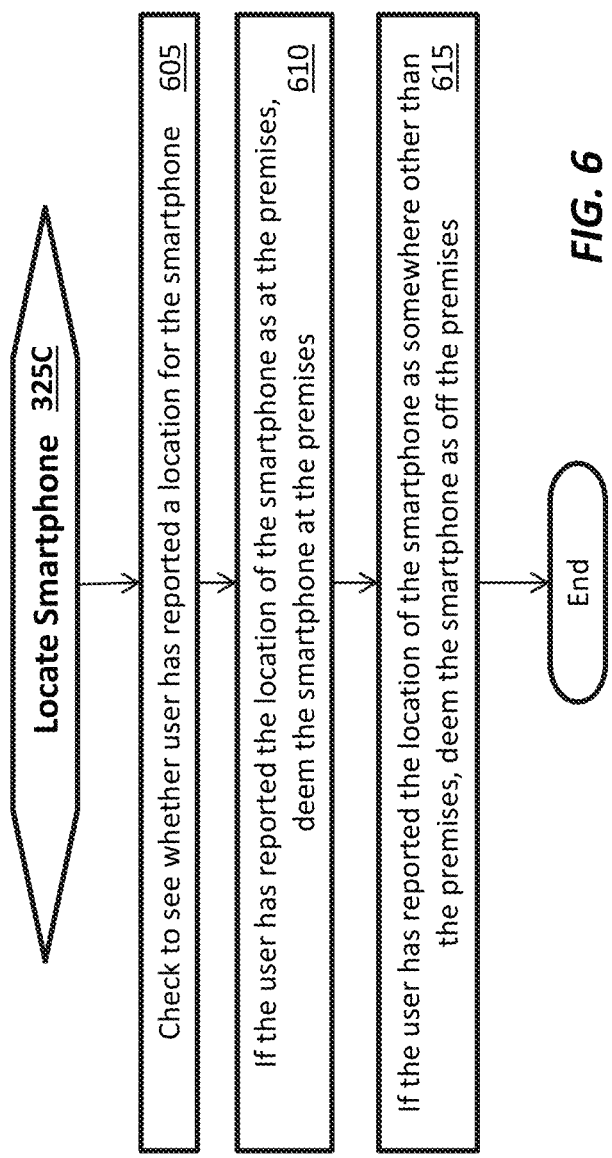
FIG. 6 is a flowchart of another process for locating a smartphone in connection with monitoring a premises as described in FIG. 3, in accordance with some example embodiments of the present technology.
Figure 7:
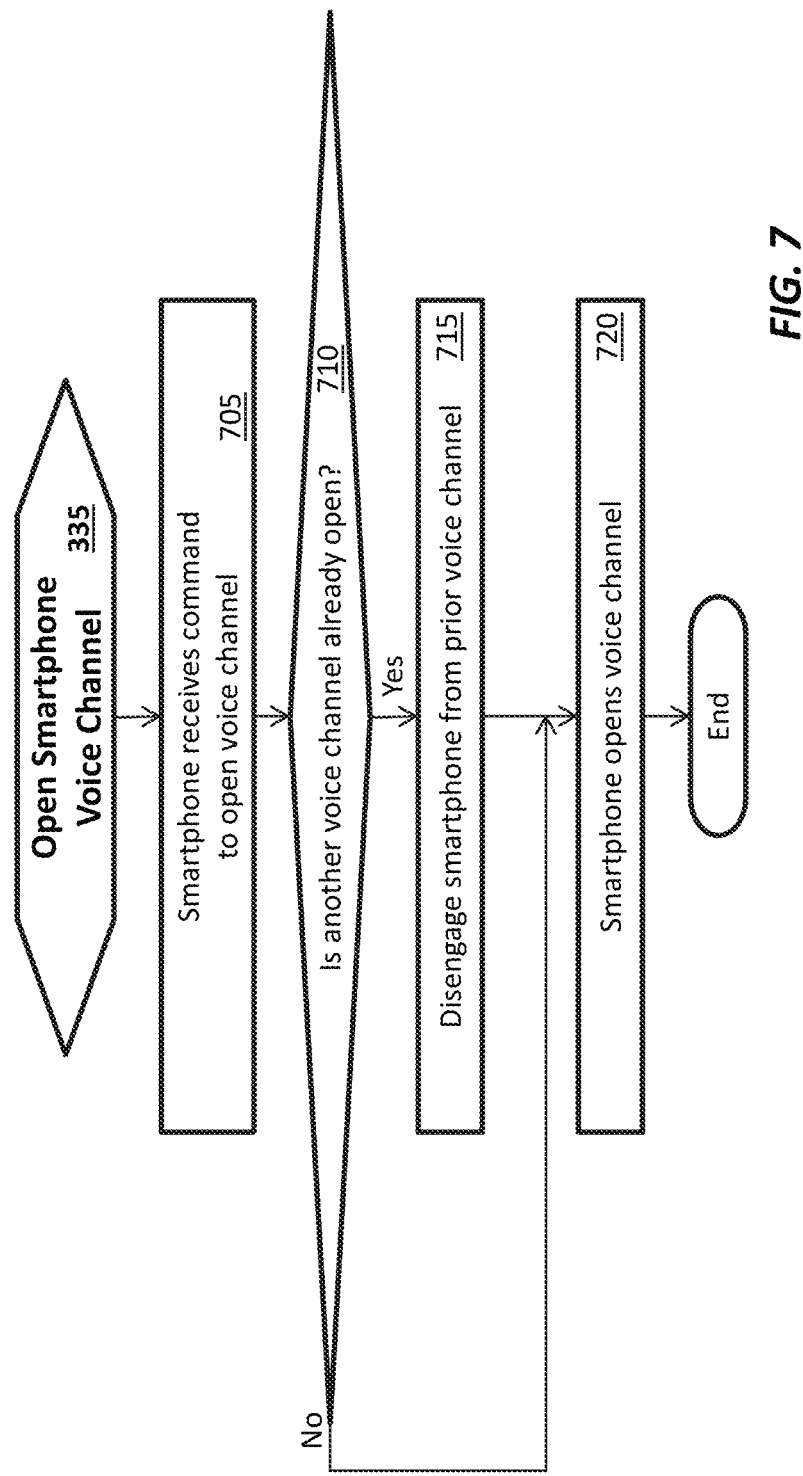
FIG. 7 is a flowchart of a process for opening a voice channel in connection with monitoring a premises as described in FIG. 3, in accordance with some example embodiments of the present technology.

Technology for providing alarm systems with associated two-way voice communications will now be described more fully with reference to FIGS. 1-7, which describe representative embodiments of the present technology. FIGS. 1 and 2 describe a representative system. FIG. 3 describes a representative alarm monitoring process that involves locating a smartphone and establishing a two-way voice session. FIGS. 4, 5, and 6 describe representative sub-processes for locating the smartphone. FIG. 7 describes a representative sub-process for opening a voice channel for the two-way voice session.

Referring now to FIG. 1, this figure illustrates a functional block diagram of an example system 100 in which multiple premises 1 connect to a central monitoring station 13 via an intermediary server 9 and in which a cellular network 23 and a smartphone 15 provide associated communication services, according to some embodiments of the present technology. The premises 1 may be geographically dispersed, with the system 100 providing alarm protection across a neighborhood, a city, or a region, for example.

Each premises 1, which may for example comprise a home, a business, a building, or a parcel of land, is monitored by a respective alarm system 3 that offers security. Each alarm system 3 comprises a respective alarm panel 2. Each alarm panel 2 communicates over a respective telecommunications circuit 6 with a common off-premises monitoring service via one or more servers. The one or more servers are represented in FIG. 1 as an intermediary server 9 that may alternatively characterized as an intermediate server. A representative server or gateway is disclosed in the Applicant's U.S. patent application Ser. No. 13/413,333 (filed Mar. 6, 2012 and entitled "Delivery of Alarm System Event Data and Audio Over Hybrid Networks") and Ser. No. 13/438,941 (filed Apr. 4, 2012 and entitled "Delivery of Alarm System Event Data and Audio"). The content and complete and entire disclosure made by each of these identified patent applications are hereby fully incorporated herein by reference.

The intermediary server 9 of the alarm monitoring service communicates with a central monitoring station 13 that provides or supports centralized monitoring services. The central monitoring station 13 is typically staffed with human operators who monitor conditions and may dispatch emergency services as needed or may otherwise intervene. Additionally, when conditions warrant, an operator may establish a two-way voice session with someone at a particular premises 1.

The system 100 further comprises at least one smartphone 15 that communicates over a cellular network to provide typical smartphone services. Additionally, when the smartphone 15 is at the premises 1, an operator at the central monitoring station 13 can open the two-way voice session with the smartphone 15. With such a connection, the smartphone 15 can capture nearby ambient audio sounds from the premises and emit audio sounds into the premises, either of which may comprise human voices. Once a two-way voice session is established between the central monitoring station 13 and a smartphone that is identified as at a particular premises 1, the operator can listen to sounds within alarm monitored premises 1. The operator can speak or transmit other audio to the smartphone 15, to be heard by anyone within sufficient physical proximity to the smartphone 15 to permit reception.

Referring now to FIG. 2, this figure illustrates an example functional block diagram depicting a representative network structure for the system 100 illustrated in FIG. 1, according to some embodiments of the present technology.

Within the alarm monitored premises 1, which, for example may be a home or business structure, is installed an alarm system 3 that includes an alarm panel 2. Additionally, there may be present one or more smartphones 15 within which a software application or app 22 is installed to support two-way communication. The alarm system 3 is connected to a telecommunications service 7 by means of a telecommunications circuit 6. The telecommunications circuit 6 may comprise the Public Switched Telephone Network lines (PSTN) or Voice over IP (VOIP) or cellular wireless telecommunications voice and data services, among other embodiments, for example.

If the telecommunications circuit 6 utilizes the PSTN, then the telecommunications service 7 would typically be the Public Switched Telephone Network. If the telecommunications circuit 6 utilizes cellular wireless telecommunications service, then the telecommunications service 7 could comprise a Mobile Telephone Switching Office (MTSO). If the telecommunications circuit 6 utilizes VoIP, then telecommunications service 7 could be a digital data network, for example the Internet.

The telecommunications service 7 connects to the intermediary server 9 of the alarm monitoring service via a telecommunications circuit 8. Example embodiments of the telecommunications circuit 8 can comprise PSTN lines or trunks, as well as VoIP and/or Session Initiation Protocol (SIP) digital circuits, to mention a few options without limitation.

The intermediary server 9 connects to the telecommunications service 11 through a telecommunications circuit 10. Example embodiments of the telecommunications circuit 10 can comprise PSTN lines or trunks, as well as VoIP and/or SIP digital circuits, to mention a few options without limitation.

The central monitoring station 13 connects to the telecommunications service 11 through a telecommunications circuit 12. Example embodiments of the telecommunications circuit 12 can comprise PSTN lines or trunks, as well as VoIP and/or SIP digital circuits, to mention a few options without limitation.

In an example embodiment, if there is an alarm event, the alarm panel 2 of the alarm system 3 sends an alarm notification message to the intermediary server 9 of the alarm monitoring service via the telecommunications circuit 6, the telecommunications service 7, and the telecommunications circuit 8.

Upon receipt of the alarm notification message, the intermediary server 9 of the alarm monitoring service performs alarm monitoring service functions. Such functions may include account validation, database logging, and associating the monitored premises' alarm system 3 with the appropriate (typically predetermined) central monitoring station 13. These services are described in more detail in Applicant's related patent applications, U.S. patent application Ser. No. 13/413,333 (filed Mar. 6, 2012 and entitled "Delivery of Alarm System Event Data and Audio Over Hybrid Networks") and Ser. No. 13/438,941 (filed Apr. 4, 2012 and entitled "Delivery of Alarm System Event Data and Audio"), for which the content and disclosure are fully incorporated herein by reference. The intermediary server 9 of the alarm monitoring service also queries one or more smartphones 15 associated with the account of the reporting monitored premises' alarm system 3 and obtains location coordinates of those smartphones 15.

Such queries can be accomplished by various methods. In some embodiments, a query is sent to the wireless service provider 23 of the smartphones 15 for a response that contains the location coordinates of smartphone 15. In some embodiments, the app 22 installed in each associated smartphone 15 can be sent a short message service (SMS) message containing a command that will trigger the app 22 to respond with location coordinates.

The intermediary server 9 of the alarm monitoring service compares the returned location coordinates of the smartphones 15 with a database record of the location coordinates of alarm monitored premises 1. If the smartphone 15 is determined to be within a predetermined proximity of alarm monitored premises 1 that would be reasonable to be within alarm monitored premises 1, then the intermediary server 9 of the alarm monitoring service connects to the smartphone 15 via the telecommunications service 11 and the telecommunications circuits 10 and 14 or 16. The telecommunications circuits 14 and 16 are typically implemented via wireless communications, such as cellular radiotelephone communications. The term "telecommunications circuit," as used herein, generally refers to any link, path, or channel for transmitting information (including voice and/or data) over a distance. The intermediary server 9 sends a command to the app 22 within the smartphone 15.

In an example embodiment, the command directs the smartphone 15 to answer on zero rings in hands-free mode and to display a message such as "Emergency Auto-answer enabled." The intermediary server 9 sends the alarm event and two-way voice command to the central monitoring station 13. The intermediary server 9 calls the first smartphone 15 identified to be within the monitored premises 1 based on location determination as described above. The call may be via the telecommunications circuit 10, the telecommunications service 11 and the telecommunications circuit 14 or 16 to the smartphone 15.

Upon receipt of the call, the app 22 within the smartphone 15 displays an alert in display or audio format, for a message such as "Emergency Call in Progress, Wait for response." The intermediary server 9 of the alarm monitoring service also places a call to the central monitoring station 13 via the telecommunications circuits 10, 12 and the telecommunications services 11, each of which may comprise wired and/or wireless services.

When the call is connected between the intermediary server 9 of the alarm monitoring service and the central monitoring station 13, the server 9 sends a command to the smartphone 15 over the established connection. That command causes the smartphone 15 to present a message such as "Emergency Call connected—wait for Operator." The intermediary server 9 of the alarm monitoring service connects its call to the smartphone 15 call. That connection can be over either the wireless service provider's wireless digital voice channels or within a VoIP or VoIP-like channel within the service provider's data channels and its call to the central monitoring station 13, for example. Accordingly, a two-way audio path is setup between the smartphone 15 and the central monitoring station 13. The smartphone 15 is thus connected in hands-free mode to the central monitoring station 13, whereupon two-way audio and conversation can occur.

While in some embodiments, a connection between the intermediary server 9 and the central monitoring station 13 precedes a connection between the intermediary server 9 and the smartphone 15, the connections may be set up on the reverse order or effectively in parallel. In some example embodiments, a first voice channel is opened between the intermediary server 9 and the smartphone 15 and then a second voice channel is opened between the intermediary server 9 and the central monitoring station 13, and the two voice channels are bridged.

In some example embodiments, more than one smartphone 15 may be identified as at the monitored premises 1, for example via the location determination discussed above. In this situation, the call by the intermediary server 9 of the alarm monitoring service could be to all such smartphones 15 within the monitored premises 1. The intermediary server 9 of the alarm monitoring service can make a bridge connection of multiple smartphone calls and connect the bridge to the central monitoring station 13. Thus, all on-premises smartphones 15 can be joined in a conference type connection to the alarm monitoring service.

In some example embodiments, if more than one smartphone 15 is determined to be at (or within a threshold distance of) the monitored premises 1, then the call by the intermediary server 9 of the alarm monitoring service to the smartphone 15 could be to all such smartphones 15 within the monitored premises 1 in a round-robin or time-slice fashion. In other words, the intermediary server 9 of alarm monitoring service could interconnect one smartphone 15 at a time to the central monitoring station 13 based upon commands sent to the server 9 from the central monitoring station 13.

In some example embodiments, during or immediately before a two-way voice session, the user of the smartphone 15 can press a predetermined soft key or message on the smartphone 15. That user entry can trigger transmission of a command to the intermediary server 9. Upon receipt of the command, the intermediary server 9 can send a command to the alarm panel 2 of the monitored premises' alarm system 3 to suppress or extinguish audible sirens and horns to enhance the ability to listen, announce, or talk to the home. The operator of central monitoring station 13 can send a similar signal to the alarm panel 2 for the same purpose.

Some example processes or methods for monitoring the premises 1 and providing two-way voice sessions via an on-premises smartphone 15 will now be discussed with reference to FIGS. 3, 4, 5, 6, and 7. It is noted that the technology may be practiced using an alternative order of the steps illustrated in FIGS. 3-7. That is, the process flows illustrated in FIGS. 3-7 are provided as examples only, and the present technology may be practiced using process flows that differ from those illustrated. Additionally, it is noted that not all steps are practiced in every embodiment. In other words, one or more of the steps may be omitted or replaced. In alternative embodiments, steps may be performed in different orders, in parallel with one another, or omitted entirely, and/or certain additional steps may be performed.

The processes illustrated in FIGS. 3-7 may be computer executed in whole or in part using one or more processors, for example using a microprocessor, a general purpose arithmetic processor, or an application specific integrated circuit (ASIC). Associated random access memory (RAM) and read only memory (ROM) can store computer-readable instructions to be executed by the processor. Accordingly a memory device can store computer-readable instructions thereon that, when executed by the processor, direct the processor to execute one or more steps illustrated in FIGS. 3-7. Such a processor may be embodied in the smartphone 15, with associated app 22, or distributed among multiple computer systems with the smartphone 15, the alarm panel 2, the intermediary server 9, and the central monitoring station 13, as well as in or among other systems disclosed here.

When the processor comprises an ASIC, process steps described herein may be executed by the ASIC according to an embedded circuitry design of the ASIC, by firmware of the ASIC, or both an embedded circuitry design and firmware of the ASIC. As a non-limiting example group, the memory device may comprise one or more of an optical disc, a magnetic disc, a semiconductor memory (i.e., a flash based memory), a magnetic tape memory, a removable memory, combinations thereof, or any other known memory means for storing computer-readable instructions.

An associated network interface may comprise hardware interfaces to communicate over data networks. An associated I/O interface may comprise device input and output interfaces such as keyboard, pointing device, display, communication, and other interfaces. A bus may electrically and communicatively couples such a processor, RAM, ROM, memory device, network interface, and I/O interface, so that data and instructions may be communicated among them, for example. In operation, the processor may be configured to retrieve computer-readable instructions stored on memory device, RAM, ROM, or another storage means, and copy computer-readable instructions to RAM or ROM for execution, for example. Such a processor can further be configured to execute the computer-readable instructions to implement various aspects and features disclosed herein. For example, a processor of the smartphone 15 may be adapted and configured to execute the processes described with reference to FIGS. 3-7.

FIGS. 3-7 will now be discussed with example reference (and without limitation) to the system 100 illustrated in FIGS. 1 and 2 and discussed above.

Referring now to FIG. 3, this figure illustrates a flowchart of an example process 300, entitled Monitor Premises, for monitoring a premises 1 in which a smartphone 15 may provide two-way voice communication from the premises 1, according to some embodiments of the present technology.

At block 305 of process 300, alarm sensors, for example motion detectors, door contacts, or smoke detectors, monitor the premises 1 and send monitoring signals to the alarm panel 2. When an alarm sensor detects an alarm event, such as a level of smoke indicative of a fire, the alarm sensor sends an alarm signal to the alarm panel 2.

At block 310, the alarm panel 2 performs an inquiry to determine whether the monitoring signals indicate an alarm event. If the signals do not indicate an alarm event, then process 300 loops back to block 305, and monitoring iterates.

If, on the other hand, a monitoring signal indicates that an alarm event has occurred, process 300 executes block 315.

At block 315, the alarm panel 2 sends an alarm notification to the intermediary server 9. The intermediary server 9 forwards the alarm notification to the central monitoring station 13. Additionally, the alarm panel 2 may sound a siren or other alarm noise.

At decision block 320, the central monitoring station 13 determines whether the alarm event warrants opening a two-way voice session between the central monitoring station 13 and the premises 1. In some example embodiments, the decision is computer implemented. In some example embodiments, the decision is made in whole or in part by a human operator at the central monitoring station 13.

If the alarm event is deemed not to be a two-way voice event, then process 300 loops back to block 305, for iteration of blocks 305, 310, 315, and 320. If the alarm event, however, is deemed be a two-way voice event, then block 325 executes.

At block 325, the smartphone 15 is located. FIGS. 4, 5, and 6 provide three example embodiments for smartphone location, in the form of process 325A, process 325B, and process 325C.

At decision block 330, the intermediary server 9 determines whether the smartphone 15 is at the premises 1 that is under an alarm condition. To make the decision, the intermediary server 9 can compare the known coordinates of the premises 1 to the location of the smartphone 15 as determined at block 325.

If the intermediary server 9 determines at block 330 that no smartphone 15 associated with the alarm system 3 is at the premises 1, then process 300 executes decision block 340. At decision block 340, a determination is made as to whether the alarm panel 2 of the alarm system 3 has an attached speaker and microphone suitable for voice communication.

If the determination is negative, then process 300 ends (and may iterate back to block 305). If, on the other hand, the alarm panel 2 does have voice capabilities, then the intermediary server 9 opens a voice channel with the alarm panel 2, opens a voice channel with the central monitoring station 13, and connects the two channels. An operator at the central monitoring station 13 can use the extended voice channel to speak with someone near the alarm panel. Process 300 ends following execution of block 345 or may loop back to block 305.

If the intermediary server 9 determines at block 330 that the smartphone 15 is at the premises 1, then process 300 branches to block 335 rather than block 340. At block 335, a two-way voice channel is opened between the smartphone 15 and the central monitoring station 13 so that an operator can speak with someone at the premises 1 via the smartphone 15. FIG. 7, discussed below, provides a flowchart for an example embodiment of block 335. In some embodiments, following block 335, process 300 ends or loops back to block 305 for iterative execution. However, in other embodiments, process 300 flows from block 335 to decision block 340. By executing block 340 and conditionally block 345 as discussed above, process 300 may enable voice communication through an available microphone and speaker of the alarm panel 2 as well as through the smartphone 15.

Referring now to FIG. 4, this figure illustrates a flowchart of an example process 325A, entitled Locate Smartphone, for locating a smartphone 15 in connection with monitoring a premises 1 as described in FIG. 3, according to some embodiments of the present technology. Process 325A provides an example embodiment of block 325 of process 300 that FIG. 3 illustrates in flowchart form.

At block 405 of process 325A, the intermediary server 9 prompts for location of all smartphones 15 that are registered as being associated with the particular alarm system 3 under alarm. In various embodiments, the prompts may take various network routes through the system 100 illustrated in FIGS. 1 and 2.

At block 410, in response to the prompts, each associated smartphone 15 queries its internal GPS sensor for location.

At block 415, each prompted smartphone 15 transmits its determined GPS location to the intermediary server 9. In various embodiments, the transmission may take various network routes through the system 100 illustrated in FIGS. 1 and 2.

At block 420, the intermediary server 9 compares the received GPS coordinates of the smartphone or phones 15 to stored location coordinates for the associated premises 1. Process 325A can thus return a positional offset to process 300 so that decision block 330 can make a determination as to whether one or more associated smartphones 15 are at the premises 1.

Process 325A ends following block 420, and execution returns to process 300 as illustrated in FIG. 3 and discussed above.

Referring now to FIG. 5, this figure illustrates a flowchart of another example process 325B, entitled Locate Smartphone, for locating a smartphone 15 in connection with monitoring a premises 1 as described in FIG. 3, according to some embodiments of the present technology. Process 325B provides another example embodiment of block 325 of process 300 that FIG. 3 illustrates in flowchart form.

At block 505 of process 325B, the intermediary server 9 prompts the cellular service provider or cellular network 23 for location of all smartphones 15 that are registered as being associated with the particular alarm system 3 under alarm. In various embodiments, the prompts may take various network routes through the system 100 illustrated in FIGS. 1 and 2.

At block 510, in response to the prompts, the cellular network 23 reports the locations of the associated smartphones 15 to the intermediary server. The cellular network 23 may maintain a dynamically updated database of phone locations, for example.

At block 515, the intermediary server 9 compares the received locations of the smartphone or phones 15 to stored locations for the associated premises 1. Process 325B can thus return positional information to process 300 so that decision block 330 can make a determination as to whether one or more associated smartphones 15 are located at the premises 1.

Process 325B ends following block 515, and execution returns to process 300 as illustrated in FIG. 3 and discussed above.

Referring now to FIG. 6, this figure illustrates a flowchart of another example process 325C, entitled Locate Smartphone, for locating a smartphone 15 in connection with monitoring a premises 1 as described in FIG. 3, according to some embodiments of the present technology. Process 325C provides another example embodiment of block 325 of process 300 that FIG. 3 illustrates in flowchart form.

At block 605 of process 325C, the intermediary server 9 checks for location reporting by any smartphone 15 associated with the alarm system 3 that is under an alarm condition. In this embodiment, a user may login, register, or otherwise report location of the smartphone 15. For example, the user may enter that he or she is home after returning from work in the evening and further may enter that he or she is leaving for work in the morning. The smartphone 15 then relays its location (for example whether it is on premises or off premises) to the intermediary server 9.

At block 610, if the user's last location entry indicates that the smartphone 15 is on the premises 1, then the intermediary server deems the smartphone 15 as on premises.

At block 615, if the user's last location entry indicates that the smartphone 15 is not on the premises 1, then the intermediary server deems the smartphone 15 as off premises.

Process 325C ends following block 615, and execution returns to process 300 as illustrated in FIG. 3 and discussed above.

Referring now to FIG. 7, this figure illustrates a flowchart of an example process 335 for opening a voice channel in connection with monitoring a premises 1 as described in FIG. 3, according to some embodiments of the present technology. The flowchart for process 335 that FIG. 7 illustrates provides an example embodiment of block 335 of process 300 that is illustrated in FIG. 3 and discussed above.

At block 705 of process 335, the intermediary server 9 issues an open voice channel command to the smartphone or phones 15 identified as located at the premises 1 under alarm condition. The smartphone 15 receives the command.

At decision block 710, the smartphone 15 determines whether another voice session is already open, for example a conventional session between the smartphone 15 and some other unrelated cellular or land phone. In other words, the smartphone 15 determines whether it is already engaged in a telephone call.

If the smartphone 15 is determined at block 710 not to be engaged in an existing call, then process 335 executes block 720. At block 720, the smartphone 15 opens a two-way voice session that extends to the central monitoring station 13 by way of the intermediary server 9.

If the smartphone 15 is determined at block 710 to be engaged in an existing call, then process 335 executes block 715. At block 715, the smartphone 15 is disengaged from the existing call in order to conduct the two-way voice session on a prioritized basis. In some example embodiments, the existing call is placed on hold. In some example embodiments, the existing call is proactively disconnected. In some example embodiments, the smartphone emits an audible message telling the user to terminate the existing call in order to conduct the two-way voice session or that the session will be automatically terminated in a designated period of time.

Whether reached through block 715 or via branching from block 710, Process 335 ends following block 720, and execution returns to process 300 as illustrated in FIG. 3 and discussed above.

Technology for alarm system voice communication has been disclosed, including various embodiments as follows without limitation.

The disclosure includes an example method. The example method can comprise the steps of: making a decision to open a two-way voice channel between a premises and an alarm monitoring station based on an alarm signal originating at the premises; responsive to the decision to open the two-way voice channel, triggering a computer to determine whether a smartphone is at the premises based on processing an electronic signal; and if the computer determines that the smartphone is at the premises, automatically opening the two-wave voice channel.

In some embodiments of the example method, the decision to open the two-way voice channel is made at a central monitoring station.

In some embodiments of the example method, the smartphone comprises the computer.

In some embodiments of the example method, the smartphone is physically separated from human contact when the two-way voice channel is automatically opened.

In some embodiments of the example method, the smartphone comprises a GPS sensor, and the computer determines whether the smartphone is at the premises based on information provided by the GPS sensor.

In some embodiments of the example method, the step of triggering the computer to determine whether the smartphone is at the premises based on processing the electronic signal comprises: receiving information from a carrier about location of the smartphone; and determining whether the smartphone is at the premises based on the received information.

In some embodiments of the example method, automatically opening the two-wave voice channel comprises automatically terminating an existing voice session with the smartphone.

The disclosure further includes another example method that can comprise the steps of: in response to receiving a signal indicating that a premises is under an alarm condition, identifying a smartphone disposed at the premises based on a GPS signal produced by the smartphone; and transmitting one or more radio frequency signals to the identified smartphone, the one or more radio frequency signals causing the smartphone to open a two-way voice session between the smartphone and an entity offsite of the premises.

In some example embodiments of the method, the entity offsite of the premises comprises a central monitoring station or an operator associated with a central monitoring service.

In some example embodiments of the method, when the smartphone opens the two-way voice session, the smartphone is physically separated from human contact.

In some example embodiments of the method, an alarm panel disposed at the premises performs the step of in response to receiving the signal indicating that the premises is under the alarm condition, identifying the smartphone disposed at the premises based on the GPS signal produced by the smartphone.

In some example embodiments of the method, intermediary server serves a system of geographically disperse alarm systems, and the intermediary server performs the step of in response to receiving the signal indicating that the premises is under the alarm condition, identifying the smartphone disposed at the premises based on the GPS signal produced by the smartphone.

In some example embodiments of the method, the one or more radio frequency signals comprise cellular signals transmitted from offsite of the premises.

In some example embodiments of the method, a prior two-way voice session with the smartphone is active when the signal is received that indicates that the premises is under the alarm condition, and opening the two-way voice session comprises overriding the prior two-way voice session.

In some example embodiments, overriding the prior two-way voice session comprises automatically terminating the prior two-way voice session.

In some example embodiments, overriding the prior two-way voice session comprises automatically placing the prior two-way voice session on hold.

The disclosure further includes another example method that can comprise the steps of: associating a smartphone with an alarm system for a premises, wherein an entity provides cellular services for the smartphone; in response to receiving a signal from the alarm system indicating an alarm condition for the premises, processing information provided by the entity about location of the smartphone to determine whether the smartphone is at the premises; and if the smartphone is determined to be at the premises, then automatically causing the smartphone to open a voice channel with another entity that is remote from the premises by sending a cellular signal to the smartphone.

In some example embodiments of the method, automatically causing the smartphone to open the voice channel comprises automatically disengaging the smartphone from another voice channel.

In some example embodiments of the method, processing information provided by the entity about location of the smartphone comprises: querying the entity for dynamic information about the smartphone; and processing the dynamic information to locate the smartphone.

In some example embodiments of the method, the voice channel comprises a two-way voice channel, and said another entity comprises a remote monitoring station.

The disclosure further includes another example method that can comprise the steps of: receiving input from a user about whether a smartphone associated with the user is disposed at a premises; in response to receiving a signal indicating that the premises is under an alarm condition, making a determination about whether the smartphone is disposed at the premises based on the received input; and if the determination indicates that the smartphone is disposed at the premises, then opening a two-way voice session between the smartphone and an entity that is offsite of the premises.

In some example embodiments of the method, the input comprises an entry by the user on the smartphone.

In some example embodiments of the method, the input comprises a self-report by the user.

In some example embodiments of the method the entity comprises a central monitoring station.

From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A method comprising the steps of:
    making a decision to open a two-way voice channel between a premises and an alarm monitoring station based on an alarm signal originating at the premises, wherein an alarm panel is located at the premises and comprises a speaker and a microphone;
    responsive to the decision to open the two-way voice channel, determining whether a smartphone is at the premises by an intermediary server performing steps comprising:
        prompting the smartphone to provide a GPS location;
        receiving the prompted GPS location from the smartphone; and
        comparing the received GPS location to a database record of location coordinates for the premises;
    if that the smartphone is determined to be at the premises, then automatically opening the two-way voice channel between the smartphone and the alarm monitoring station by transmitting a command from the intermediary server to the smartphone; and
    if the smartphone is not determined to be at the premises, then automatically opening the two-way voice channel between the alarm panel and the alarm monitoring station,
    wherein the intermediary server serves a system of geographically disperse alarm systems.

2. The method of claim 1, wherein automatically opening the two-way voice channel between the smartphone and the alarm monitoring station by transmitting a command from the intermediary server to the smartphone comprises
    prompting the smartphone to answer on zero rings in hands-free mode and to display a message that emergency auto-answer has been enabled.

3. The method of claim 1, wherein the smartphone is one of a plurality of smart s hones that are registered as associated with the premises and that are determined to be simultaneously at the premises based on GPS locations received at the intermediary server, and
    wherein automatically opening the two-way voice channel between the smartphone and the alarm monitoring station comprises opening the two-way voice channel so that the plurality of smartphones can simultaneously engage in audio communication with the alarm monitoring station in conference call fashion.

4. The method of claim 1, wherein the smartphone is physically separated from human contact when the two-way voice channel is automatically opened.

5. The method of claim 1, wherein the smartphone is one of a plurality of smartphones that are registered as associated with the premises and that are determined to be simultaneously at the premises based on GPS locations received at the intermediary server, and
  wherein automatically opening the two-way voice channel between the smartphone and the alarm monitoring station further comprises connecting the plurality of smartphones with the alarm monitoring station so the alarm monitoring station can toggle between each of the connected plurality of smartphones.

6. The method of claim 1, wherein the smartphone is one of a plurality of smartphones that are registered as associated with the premises and that are determined to be simultaneously at the premises based on GPS locations received at the intermediary server, and
  wherein automatically opening the two-way voice channel between the smartphone and the alarm monitoring station further comprises connecting the plurality of smartphones with the alarm monitoring station in a round-robin or time-slice fashion.

7. The method of claim 1, wherein automatically opening the two-wave voice channel between the smartphone and the central monitoring station comprises automatically terminating an existing voice session with the smartphone.

8. A method comprising the steps of:
  associating a smartphone with an alarm system for a premises, wherein an entity provides cellular services for the smartphone;
  in response to receiving a signal from the alarm system indicating an alarm condition for the premises, processing information provided by the entity about a location of the smartphone to determine whether the smartphone is at the premises;
  if the smartphone is determined to be at the premises, then automatically causing the smartphone to open a voice channel with another entity that is remote from the premises by sending a cellular signal to the smartphone; and
  if the smartphone is determined to be off of the premises, then automatically opening the voice channel between the another entity and an alarm panel of the alarm system.

9. The method of claim 8, wherein automatically causing the smartphone to open the voice channel comprises automatically disengaging the smartphone from another voice channel and causing the smartphone to display an emergency message.

10. The method of claim 8, wherein processing information provided by the entity about location of the smartphone comprises:
  querying the entity for dynamic information about the smartphone; and
  processing the dynamic information to locate the smartphone.

11. The method of claim 8, wherein the voice channel comprises a two-way voice channel, and
  wherein said another entity comprises a remote monitoring station.

12. A method comprising the steps of:
  receiving input from a user about whether a smartphone associated with the user is disposed at a premises that is under protection by an alarm system comprising an alarm panel;
  in response to receiving a signal indicating that the premises is under an alarm condition, making a determination about whether the smartphone is disposed at the premises based on the received input;
  if the determination indicates that the smartphone is disposed at the premises, then opening a two-way voice session between the smartphone and an entity that is offsite of the premises; and
  if the determination indicates that the smartphone is not disposed at the premises, then opening the two-way voice session between the entity and a microphone and speaker of the alarm panel.

13. The method of claim 12, wherein the input comprises an entry by the user on the smartphone.

14. The method of claim 12, wherein the input comprises a self-report by the user.

15. The method of claim 12, wherein the entity comprises a central monitoring station.

* * * * *